US008748803B2

(12) United States Patent
Guillaud et al.

(10) Patent No.: US 8,748,803 B2
(45) Date of Patent: Jun. 10, 2014

(54) PORTABLE ELECTRONIC DEVICE, PARTICULARLY AN ELECTRONIC CARD, PROVIDED WITH AN OPTICAL SWITCH

(75) Inventors: Philippe Guillaud, Los Angeles, CA (US); Cyril Lalo, Los Angeles, CA (US)

(73) Assignee: NagraID Security S.A., La Chaux-de-Fonds (CH)

(*) Notice: Subject to any disclaimer, the term of this patent is extended or adjusted under 35 U.S.C. 154(b) by 307 days.

(21) Appl. No.: 13/499,157

(22) PCT Filed: Dec. 10, 2009

(86) PCT No.: PCT/EP2009/066862
§ 371 (c)(1),
(2), (4) Date: Jun. 1, 2012

(87) PCT Pub. No.: WO2011/038787
PCT Pub. Date: Apr. 7, 2011

(65) Prior Publication Data
US 2012/0228478 A1    Sep. 13, 2012

(30) Foreign Application Priority Data

Sep. 29, 2009  (WO) ................. PCT/EP2009/062631

(51) Int. Cl.
*G06K 19/073* (2006.01)
*H03K 17/78* (2006.01)

(52) U.S. Cl.
USPC ................ 250/221; 250/214 SW; 250/214 B; 250/208.2; 235/382

(58) Field of Classification Search
USPC ........ 250/221, 214 SW, 214 B, 214 R, 208.2; 235/375, 380, 382, 382.5
See application file for complete search history.

(56) References Cited

U.S. PATENT DOCUMENTS

| | | | | |
|---|---|---|---|---|
| 4,198,563 A * | 4/1980 | Elssner | .................. | 250/214 AL |
| 4,659,919 A * | 4/1987 | Price | .............................. | 446/175 |
| 4,847,483 A * | 7/1989 | Nishibe et al. | .......... | 250/214 AL |
| 4,851,689 A * | 7/1989 | Hasegawa | ................. | 250/214 B |
| 5,206,521 A * | 4/1993 | Ruiz et al. | ..................... | 250/569 |
| 5,532,472 A * | 7/1996 | Furuta | ........................ | 250/214 B |
| 5,627,355 A * | 5/1997 | Rahman et al. | ............... | 235/380 |

(Continued)

FOREIGN PATENT DOCUMENTS

| | | |
|---|---|---|
| EP | 2 006 797 | 12/2008 |
| GB | 2 407 189 | 4/2005 |
| WO | 2007 131052 | 11/2007 |

OTHER PUBLICATIONS

International Search Report Issued Jun. 14, 2010 in PCT/EP09/66862 Filed Dec. 10, 2009.

*Primary Examiner* — John Lee
(74) *Attorney, Agent, or Firm* — Griffin & Szipl, P.C.

(57) ABSTRACT

A portable electronic device, for example an electronic card, includes at least one electronic unit associated to an optical switch which can be actuated by a user and which includes two photo-detectors arranged sufficiently far from each other in the electronic device to enable the user to cover only one of the two photo-detectors with one finger. The switch includes a logical circuit to which are provided a first and a second light reception signal respectively coming from the two photo-detectors. The logical circuit is arranged to supply a signal which only indicates actuation of the optical switch when the first and second light reception signals correspond to two different logical states for the logic circuit.

10 Claims, 2 Drawing Sheets

(56) References Cited

U.S. PATENT DOCUMENTS

| | | | |
|---|---|---|---|
| 6,072,328 A * | 6/2000 | Takuma ............................ 326/8 |
| 6,592,044 B1 * | 7/2003 | Wong et al. .................... 235/493 |
| 6,641,050 B2 * | 11/2003 | Kelley et al. .................. 235/492 |
| 6,742,713 B1 * | 6/2004 | Trinkel .......................... 235/492 |
| 6,849,845 B2 * | 2/2005 | Lauffenberger et al. ...... 250/214 SW |
| 7,146,509 B2 * | 12/2006 | Marinet et al. ................ 713/194 |
| 7,628,328 B2 * | 12/2009 | Sun et al. ...................... 235/454 |
| 7,942,339 B2 * | 5/2011 | Guillaud et al. .............. 235/492 |
| 8,005,426 B2 * | 8/2011 | Huomo et al. ................. 455/41.2 |
| 2006/0266831 A1 * | 11/2006 | Kozlay ........................ 235/451 |
| 2007/0040683 A1 | 2/2007 | Oliver et al. |
| 2008/0099556 A1 * | 5/2008 | Park ........................... 235/382.5 |
| 2008/0149735 A1 * | 6/2008 | Kozlay ........................ 235/492 |
| 2009/0051497 A1 | 2/2009 | Miyaso |
| 2010/0052912 A1 * | 3/2010 | Arneson et al. ............. 340/572.7 |
| 2010/0258637 A1 * | 10/2010 | Droz et al. .................... 235/492 |
| 2010/0258638 A1 * | 10/2010 | Guillaud et al. .............. 235/492 |
| 2010/0275259 A1 * | 10/2010 | Adams et al. .................... 726/19 |
| 2011/0062242 A1 * | 3/2011 | Cowcher ...................... 235/492 |
| 2011/0168875 A1 * | 7/2011 | Okuda ................... 250/214 SW |
| 2011/0174874 A1 * | 7/2011 | Poznansky et al. ........... 235/379 |
| 2012/0228478 A1 * | 9/2012 | Guillaud et al. ........... 250/208.2 |
| 2013/0193314 A1 * | 8/2013 | Schweninger et al. 250/214 SW |

* cited by examiner

PORTABLE ELECTRONIC DEVICE, PARTICULARLY AN ELECTRONIC CARD, PROVIDED WITH AN OPTICAL SWITCH

This is a National Phase Application in the United States of International Patent Application No. PCT/EP2009/066862 filed Dec. 10, 2009, which claims priority on International Patent Application No. PCT/EP2009/062631, filed Sep. 29, 2009. The entire disclosures of the above patent applications are hereby incorporated by reference.

FIELD OF THE INVENTION

The present invention concerns the field of portable electronic devices, in particular electronic cards, provided with a switch that can be actuated by a user to activate an electronic unit and/or to supply a command or instruction thereto. It will be noted that, within the scope of the present invention, the function of the switch is in no way limiting, and may relate to the activation of an electronic unit or only one part thereof (in particular for powering or initialising the unit or establishing a connection with another unit of the portable electronic device), or to the launching of an application or a step in an application, or to a command or instruction, in particular for selecting an element in a sequentially displayed list or for giving a transaction confirmation signal, etc.

BACKGROUND OF THE INVENTION

Portable electronic devices provided with switches having various configurations are known. In general, these switches are formed by a pressure device on which the user has to exert a certain level of pressure to activate the switch, for example, a keyboard key or a push-button. It is also known that a switch can be achieved without any exertion of pressure, for example, in the form of a capacitive sensor sensitive to the presence of a finger or a light sensitive optical sensor.

In particular, in the case of electronic cards, the use of a push-button incorporated into the card, which has an elastically deformable area for activating the switch, has certain drawbacks. First of all, the arrangement of these push buttons makes the cards more complex to manufacture. Next, the presence of an area that can be elastically deformed by a user's finger raises a problem if it is sought to obtain a flat card with a surface having no hollows or raised portions. Moreover, repeated activation of the switch tends to leave a slight depression in the area of the push button. Finally, a major problem arises from the fact that an electronic card, particularly a bank card, is generally carried on the person, so that pressure may be inadvertently and randomly exerted on the push button and may thereby inadvertently activate the switch. This may cause a problem of electric power consumption or disrupt the proper operation of an application of the electronic card.

SUMMARY OF THE INVENTION

It is an object of the present invention to provide a portable electronic device provided with a switch that can be activated by a user, which does not have the drawbacks of the aforementioned prior art. In particular, it is an object of the invention to provide an electronic card provided with a switch which can be actuated by a user and does not require any local deformation of the card, and which does not react to the application of pressure.

Generally, the present invention concerns a portable electronic device of electronic card type including at least one electronic unit and one switch that is associated with the electronic unit and can be actuated by a user's finger, particularly to activate and/or supply the unit with a command or instruction. In the portable electronic unit the switch is formed by two independent photo-detectors, which are oriented to receive incident light on a same surface of the portable electronic device and are sufficiently far from each other to enable the user to cover only one of the two photo-detectors with his/her finger, and the switch includes a logic circuit arranged to provide a signal indicating actuation of the switch only when a first light reception signal and a second light reception signal respectively supplied by the two photo-detectors correspond respectively to the reception of light and non-reception of light or a covered state for the logic circuit.

According to a particular embodiment, the present invention concerns an electronic card including at least one electronic unit and one switch that can be activated by a user and is associated with the electronic unit, particularly for actuating and/or supplying the unit with a command or instruction. In this electronic card, the switch is formed by two independent photo-detectors, which are oriented to receive incident light on a same surface of the electronic card and are sufficiently far from each other to enable the user to cover only one of these two photo-detectors with his finger, and the switch further includes a logic circuit to which first and second light reception signals are respectively supplied by the two photo-detectors, wherein the logic circuit is arranged to provide a signal indicating actuation of the switch only when the first and the second light reception signals correspond to two different logic states for the logic circuit.

According to a particular feature of the invention, the two photo-detectors are arranged to supply a voltage signal whose value varies according to the quantity of light received. According to a preferred embodiment, each of the two photo-detectors includes a light sensor and a comparator. The comparator receives at input a reference signal and a measuring signal from the light sensor. It supplies at output a logic signal that is in a first logic state when the value of the measuring signal is higher than that of the reference signal and otherwise is in a second logic state. The comparator output signal defines the first or second light reception signal respectively.

The logic circuit, according to a first embodiment, is formed by an Exclusive OR (XOR) gate, respectively receiving the first and second signals at its two inputs. The logic circuit according to a second embodiment is formed by an AND gate with a single inverter arranged at one of its two inputs, which respectively receive the first and second signals. According to a particular embodiment of the invention, the two photo-detectors are respectively arranged in two opposite areas of the electronic card.

The portable electronic device according to the invention, therefore, allows an optical switch to be used very efficiently owing to the fact that the optical switch is formed of two independent photo-detectors sufficiently far from each other to allow a user to obscure only one of the two photo-detectors with one finger. When the two photo-detectors receive light or when they are in darkness and are receiving little or no light, the optical switch is not actuated and thus remains in an OFF state.

It is clear that, with only one photo-detector, it is difficult to provide an optical switch for an electronic card, given that it is difficult for the user to control the reception of light by a single photo-detector. When the user takes his electronic card out of his card holder for example, the single photo-detector then immediately receives light, which actuates the switch before the user has taken any deliberate action. The presence of two photo-detectors at a distance from each other provides an efficient optical switch, which is generally only actuated when the user so wishes, in particular, to start a banking application.

More specifically, in accordance with a first non-limiting illustrative embodiment of the present invention, a portable electronic device (2, 3) is provided that includes at least one electronic unit (4) and one switch (12, 20, 22, 30), which can be actuated by a user and associated with the electronic unit, particularly to activate and/or supply the electronic unit with a command or instruction, characterized in that the switch is formed by two independent photo-detectors (6, 8) that are sufficiently far from each other to enable the user to cover only one of the two photo-detectors with his finger, and in that the switch includes a logic circuit (14, 24) to which are provided a first and a second light reception signal (S1, S2) coming respectively from the two photo-detectors, wherein the logic circuit is arranged to supply a signal (S3, S4, S5) that only indicates actuation of the switch when the first and the second light reception signal correspond to two different logical states for the logic circuit. In accordance with a second non-limiting illustrative embodiment of the present invention, the first non-limiting embodiment is modified so that the two photo-detectors are arranged to supply a voltage signal whose value varies according to the quantity of light received.

In accordance with a third non-limiting illustrative embodiment of the present invention, the first and second non-limiting embodiments are modified so that each of the two photo-detectors includes a light sensor (6A, 8A) and a comparator (18), wherein the comparator receives at input a reference signal and a measuring signal (S01, S02) from the light sensor and supplies at output a logic signal, which is in a first logic state when the value of the measuring signal is higher than that of the reference signal and, otherwise, is in a second logic state, wherein the output signal from the comparator defines the first signal and the second light reception signal, respectively. In accordance with a fourth non-limiting illustrative embodiment of the present invention, the second and third non-limiting embodiments are further modified so that the logic circuit (14) is formed by an Exclusive OR (XOR) gate receiving at the two inputs thereof the first and second light reception signals, respectively. In accordance with a fifth non-limiting illustrative embodiment of the present invention, the second and third non-limiting embodiments are further modified so that the logic circuit (24) is formed by an AND gate with a single inverter arranged at one of the two inputs thereof that respectively receive the first and second light reception signals.

In accordance with a sixth non-limiting illustrative embodiment of the present invention, the first, second, third, fourth and fifth non-limiting embodiments are further modified so that the switch (30) includes a delay circuit (32) arranged to supply the signal (S5) that indicates actuation of the switch when the two different logic states have simultaneously lasted for longer than a reference period. In accordance with a seventh non-limiting illustrative embodiment of the present invention, the sixth non-limiting embodiment is modified so that the delay circuit (32) includes a counter (34) that receives a clock signal (36), which is reset to zero as soon as the first and second light reception signals (S1, S2) correspond to the same logic state, wherein the counter is activated as soon as the first and second signals have the different logic state and supplies an inhibition signal (S6) until the counter has reached a certain level. In accordance with an eighth non-limiting illustrative embodiment of the present invention, the first, second, third, fourth, fifth, sixth and seventh non-limiting embodiments are further modified so that the electronic device forms an electronic card. In accordance with a ninth non-limiting illustrative embodiment of the present invention, the eighth non-limiting embodiment is modified so that the two photo-detectors are respectively arranged in two opposite areas (Z1, Z2) of the electronic card. In accordance with a tenth non-limiting illustrative embodiment of the present invention, the eighth non-limiting embodiment is modified so that the two photo-detectors are arranged in the same area (Z3) of the electronic card.

BRIEF DESCRIPTION OF THE DRAWINGS

Other features and advantages of the present invention will also appear upon reading the following description, made with reference to the annexed drawings, given by way of non-limiting example, in which.

DETAILED DESCRIPTION OF EMBODIMENTS OF THE INVENTION

Figure 1:
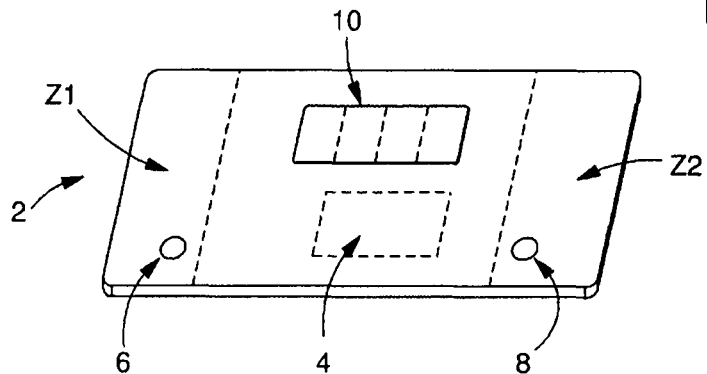
FIG. 1 shows schematically an electronic card according to the invention.

FIG. 1 shows an electronic card according to the present invention. This card 2 includes an electronic unit 4 and a switch, which can be actuated by a user and is formed by two independent photo-detectors 6 and 8, which are sufficiently far from each other to enable the user to cover only one of these two photo-detectors 6 and 8 with one finger. The two photo-detectors are respectively arranged in two opposite areas Z1 and Z2 of the electronic card. This card also includes a digital display 10 for giving at least one piece of information or one instruction to the user. This display 10 is not necessary for the present invention, but it is advantageous for implementing several possible applications, particularly banking applications.

Figure 2:
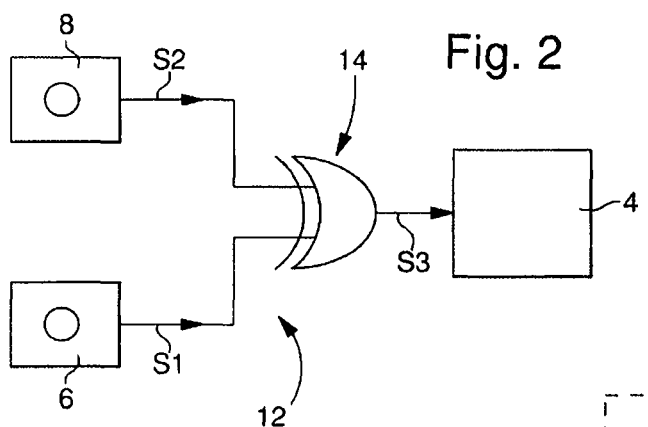
FIG. 2 shows schematically a general embodiment of an optical switch incorporated in a portable electronic device according to the invention.

FIG. 2 shows a first general embodiment of the optical switch according to the invention. Optical switch 12 is associated with an electronic unit 4, particularly for activating or supplying the unit with a command or instruction. In the variant shown, optical switch 12 sends a signal S3 directly to electronic unit 4. However, in another variant that is not shown, the optical switch may act on a connection between the electronic unit 4 and another electronic unit or an antenna. Thus, the optical switch can act directly on an electronic unit by providing it with a digital signal corresponding to an ON or OFF state, or act on a peripheral element and, particularly, on a simply electrical connection that can be opened or closed using the optical switch. These examples are in no way limiting. Optical switch 12 includes a logic circuit 14 to which a first light reception signal S1 and a second light reception signal S2 are supplied, respectively, from the two photo-detectors 6 and 8. In this first embodiment, the logic circuit 14 is formed by an Exclusive OR gate, also called an XOR gate in the technical field concerned.

Signal S3 indicating actuation of switch 12 has a high level or logic state "1" when the first signal S1 and second signal S2 respectively correspond to two different logic states for logic circuit 14. Thus, according to the invention, when the two photo-detectors 6 and 8 both receive substantially the same quantity of light, or substantially no light, optical switch 12 is not actuated and the signal that it supplies corresponds to a low level or logic state "0" in the preferred variant. This logic state "0" corresponds to an open position of optical switch 12, i.e., to an OFF state. When the user obscures or covers only one of the two photo-detectors while electronic card 2 is in a luminous environment, the XOR gate supplies a signal S3 corresponding to logic state "1", i.e., to a closed position of the switch corresponding to an ON state. Thus, logic circuit 4 only receives a signal indicting activation of the optical switch when the first and second light reception signals correspond to two different logic states of the XOR logic gate.

When the electronic card is entirely in darkness, particularly inside a wallet or card holder, the optical switch remains continuously deactivated. Likewise, when electronic card 2 is entirely situated in a luminous environment and neither of the two photo-detectors is obscured, the optical switch also remains deactivated. Only an action consisting in obscuring or covering one of the two photo-detectors causes actuation of optical switch 12 and communication of a command or instruction to the electronic system incorporated in card 2.

It will be noted that, in the first embodiment of the invention and in the other embodiments described below, the photo-detectors 6 and 8 are arranged to provide voltage signals whose value varies according to the quantity of light received. Thus, signals S1 and S2 are voltage signals applied to logic circuit 14. Those skilled in the art know how to make these photo-detectors. Signals S1 and S2 may be either analogue signals, or digital signals provided by an analogue-digital converter internal to the photo-detectors.

Figure 4:
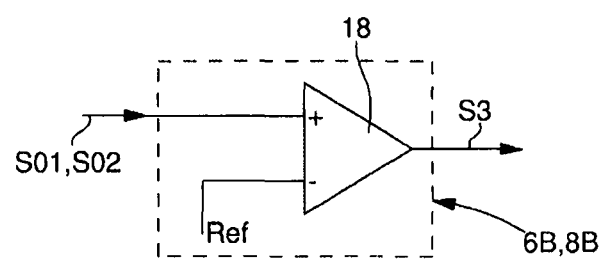
FIG. 4 shows a possible arrangement for an analogue-digital converter of the variant shown in FIG. 3.
Figure 3:
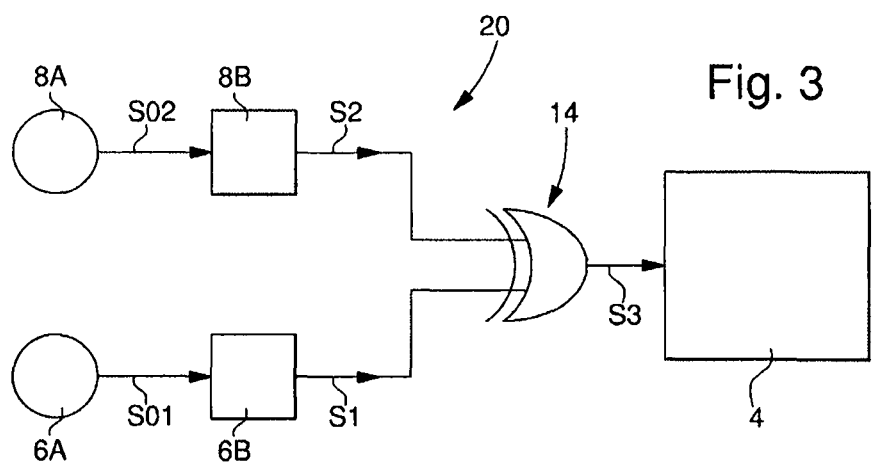
FIG. 3 shows an improved variant of the general embodiment of FIG. 2.

FIG. 3 shows a preferred variant of the first embodiment wherein each photo-detector is formed by a light sensor 6A and 8A respectively, and by an analogue-digital converter 6B and 8B respectively supplying a digital signal S1 and S2. Thus, in this specific variant, the two light sensors 6A and 8A, respectively, supply two analogue signals SO1 and SO2 to converters 6B and 8B. A variant of these converters is shown in FIG. 4. They are simply formed of a comparator 18 respectively receiving analogue signal SO1 and SO2 at a positive input and a reference signal Ref at a negative input. This reference signal may be adjusted or determined so that the change from a low level to a high level of signal S3 leaving comparator 18 corresponds to a certain level of light reception by the corresponding photo-detector. In particular, signal S3 may be arranged to only indicate actuation of optical switch 20 when one of the two photo-detectors receives a quantity of light corresponding to a sufficient level of lighting for a user to be able to read digital display 10 properly. Generally, the comparator supplies at output a logic signal that is in a first state when the value of the measuring signal is higher than that of the reference signal and otherwise is in a second state. The comparator output logic signal is supplied to logic circuit 4.

Figure 5:
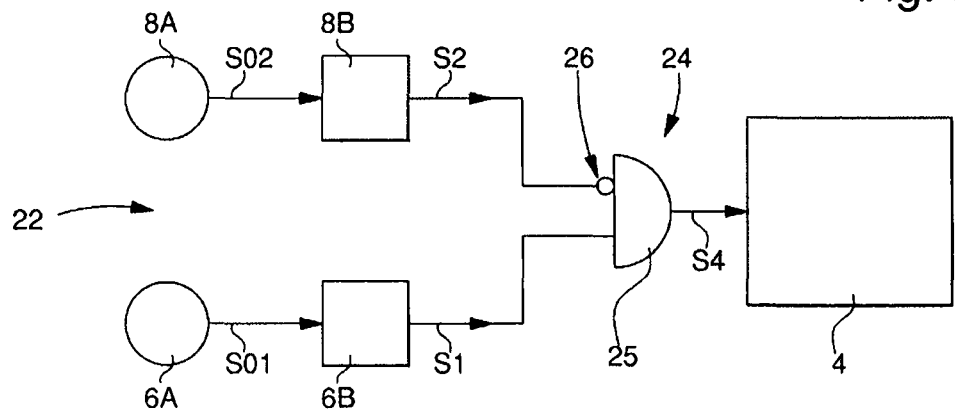
FIG. 5 shows a second embodiment of an optical switch according to the invention.

FIG. 5 shows a second embodiment of the portable electronic device according to the invention. The references previously described will not be described again in detail here. This second embodiment differs in that logic circuit 24 is different from logic circuit 14 of the first embodiment. Logic circuit 24 is formed by an AND gate 25 with the arrangement of a single inverter 26 at one of its two inputs. These two inputs respectively receive logic signals S1 and S2. Thus, output signal S4 from logic circuit 24 only has a high level "1" when the first signal S1 corresponds to a logic state "1" and the second signal S2 corresponds to a logic state "0". Consequently, as regards the operation of optical switch 22 according to this second embodiment, the only situation that causes actuation of this optical switch 22 and, thus, a control signal S4 corresponding to an ON signal for electronic unit 4 is where one determined photo-detector receives sufficient light and the other is covered or obscured, in particular, by the user's finger, In the first embodiment, a signal indicating actuation of the optical switch is supplied regardless of whether it is the first photo-detector 6 or the second photo-detector 8 that is obscured while the other is receiving light. In the second embodiment, this symmetry does not exist. The only situation that results in actuation of the optical switch for the second embodiment is where photo-detector 6 receives light whereas photo-detector 8 does not. The variant shown in FIG. 5 could advantageously correspond to the arrangement of an electronic card provided for a person who normally uses his left hand. Thus, when this person is holding the electronic card, if his finger covers or obscures the photo-detector 6 located in area Z1 (FIG. 1), this will not cause actuation of the optical switch. This advantageously prevents the optical switch from being actuated inadvertently by a user who takes hold of the electronic card in his left hand. It is thus clear that cards can advantageously be specified for left handed people or for right handed people, i.e., who generally use their right hand. In this latter case, the inputs of logic circuit 24 will simply be reversed so that inverter 26 receives the first signal S1.

Figure 6:
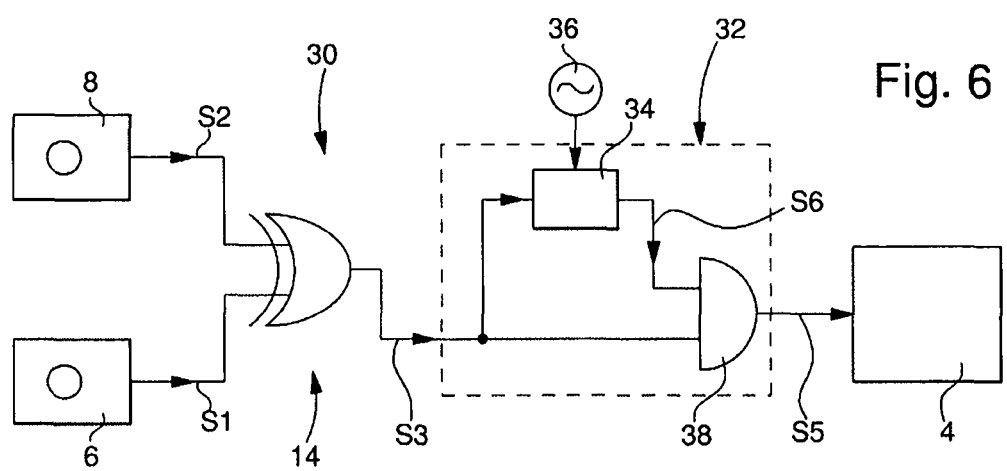
FIG. 6 shows a third improved embodiment of an optical switch according to the invention.

A third embodiment of the invention will be described with reference to FIG. 6. This improved embodiment of the invention is used to overcome a problem that may arise with the first and second embodiments. Indeed, for the optical switch to be efficient, it must be prevented from being inadvertently actuated as far as possible. During certain operations of the electronic card, there may be a certain time lag for the two photo-detectors during the transition between a luminous environment and a dark environment. Depending on the arrangement of the two photo-detectors inside the electronic card, particularly as shown in FIG. 1, it is possible that, when the electronic card is inserted into a card holder, or the pocket of a piece of clothing, one of the two photo-detectors is covered before the second one. These periods of transition between a dark environment and a luminous environment, which are generally of relatively short duration, may cause inadvertent actuation of the optical switch. To overcome this problem, the improved embodiment of FIG. 6 provides the arrangement of a delay circuit 32 in optical switch 30.

In the variant shown, the delay circuit 32, given by way of non-limiting example, is arranged after logic circuit 14. This delay circuit thus receives a logic signal S3 indicating whether the two photo-detectors 6 and 8 have different logic states. Signal S3 is, on the one hand, directly supplied to an input of an AND logic gate 38, and on the other hand, to an N counter, referenced 34. This counter 34 is clocked by a clock signal 36. The counter output signal is supplied to the second input of logic gate 38. Counter 34 is arranged so that it remains at the reset value as long as the signal S3 received at the input thereof corresponds to a low level, i.e., to a logic state "0". As soon as logic signal S3 changes to a high level, i.e., to a logic state "1", the counter is incremented to value N. Preferably, it remains at this value N as long as input signal S3 has a high level. Output signal S6 from counter 34 corresponds to a logic state "0" as long as the counter has a lower value than N. Only when the counter has value N does signal S6 correspond to a logic state "1".

The AND logic gate supplies a logic signal S5 indicating actuation of the optical switch 30 to electronic unit 4 as soon as signal S6 changes to logic state "1". Thus, this logic signal S5 only has a logic state "1" when counter 34 reaches the value corresponding to N. In order to be incremented from zero value to value N, counter 34 operates for a certain time period T determined by the clock signal, which clocks the counter. Consequently, as long as the two photo-detectors 6 and 8 have not been in a different logic state for at least the determined time period T defining a delay or lag in activation of optical switch 30, the signal S5 supplied to electronic unit 4 corresponds to an OFF control signal, i.e., to a deactivated state for the optical switch. The optical switch is thus only actuated when the two photo-detectors 6 and 8 have, respectively, supplied first and second signals corresponding to two different logic states for a greater length of time than time period or lag T. If the different logic states last for a shorter period than the time period T, then signal S3 supplied by logic circuit 14 again changes to logic state "0", before counter 34 reaches maximum value N. This causes the counter to be reset before it reaches value N and signal S6 therefore remains in logic state "0". Signal S6 thus defines an inhibition signal preventing actuation of the optical switch during a determined time lag. The switch is not actuated in an initial period after the start of an external situation that corresponds to a normal actuation situation for the switch, namely, differentiated reception of light by the two photo-detectors.

In short, delay circuit 32 is arranged to supply the signal indicating actuation of the optical switch to electronic unit 4 only when the two different logic states of the two logic signals S1 and S2 have simultaneously lasted longer than a reference period. The counter provided in the delay circuit is reset to zero as soon as the first and second light reception signals S1 and S2 correspond to the same logic state. The counter is activated as soon as these first and second signals have a different logic state and supplies an inhibition signal provided that it has not reached a certain given level. It will be noted that the inhibition signal may preserve logic state "1" as long as the counter remains at value N (logic state "1" corresponds here to a non-inhibited state) or it may only supply a pulse of limited duration. Other variants and alternatives may be envisaged by those skilled in the art.

Figure 7:
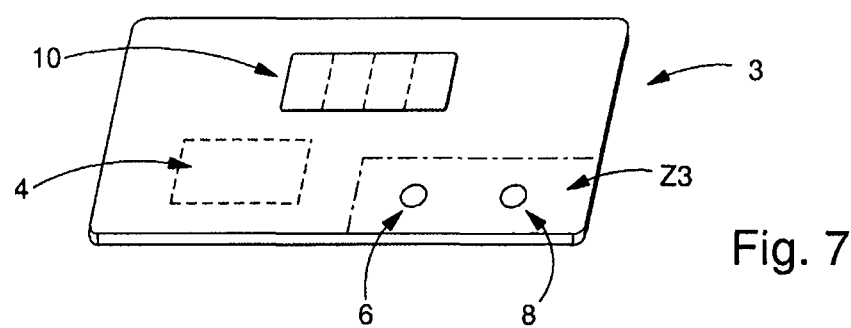
FIG. 7 shows an alternative arrangement of the two photo-detectors of the optical switch in an electronic card.

FIG. 7 shows an alternative arrangement of the photo-detectors 6 and 8 in electronic card 3. This alternative partly overcomes the problem mentioned with reference to the first and second embodiments. Unlike the variant of FIG. 1, photo-detectors 6 and 8, more specifically the light sensors forming the photo-detectors, are arranged in the same area Z3 of electronic card 3. Thus, as they are arranged relatively close to each other, the time period during which the two photo-detectors can be in a different situation, i.e., respectively covered and exposed to light, generally becomes shorter. However, card 3 requires more careful handling by the user so that he avoids simultaneously covering both photo-detectors 6 and 8 when handling the card. The two photo-detectors can thus be brought closer together, while remaining within the scope of the present invention, by providing, however, an arrangement wherein the two photo-detectors are sufficiently far from each other to enable the user to cover only one of these two photo-detectors with one finger. Other variants in the arrangement of the two photo-detectors may easily be provided by those skilled in the art. For example, it is possible to arrange both photo-detectors in two areas opposite each other diagonally across the card.

The invention claimed is:

1. A portable electronic device of the electronic card type, comprising:
   (a) at least one electronic unit; and
   (b) one switch that is associated with the at least one electronic unit and that is actuatable by a user's finger, and that activates, or supplies, or activates and supplies, the at least one electronic unit with a command or instruction,
   wherein the one switch includes
      i. two independent photo-detectors that are oriented to receive incident light on a same surface of the portable electronic device and that are arranged sufficiently far from each other to enable the user to cover only one of the two photo-detectors with one finger; and
      ii. a logic circuit arranged to supply a first signal that only indicates actuation of the one switch when a first light reception signal and a second light reception signal, respectively supplied by the two photo-detectors, respectively correspond to a reception of light and to a non-reception of light or a covered state.

2. The portable electronic device according to claim 1, wherein the two photo-detectors are arranged to supply a voltage signal whose value varies according to a quantity of light received.

3. The portable electronic device according to claim 1, wherein each of the two photo-detectors includes a light sensor and a comparator, wherein each comparator receives at an input a reference signal and a measuring signal from the corresponding light sensor and this comparator supplies at an output a logic signal, wherein the logic signal is in a first logic state when a value of said measuring signal is higher than a value of said reference signal and, otherwise, the logic signal is in a second logic state, wherein the two logic signals outputted from both comparators respectively define said first light reception signal and said second light reception signal.

4. The portable electronic device according to claim 2, wherein said logic circuit comprises an Exclusive OR gate receiving at two inputs thereof said first light reception signal and said second light reception signal, respectively.

5. The portable electronic device according to claim 2, wherein said logic circuit includes an AND gate with a single inverter arranged at one of two inputs of the AND gate, wherein the two inputs of the AND gate respectively receive said first light reception signal and said second light reception signal.

6. The portable electronic device according to claim 3, wherein said one switch includes a delay circuit arranged to supply said first signal indicating actuation of said one switch when said first logic state and said second logic state, respectively at the outputs of both comparators, have simultaneously lasted for longer than a reference period.

7. The portable electronic device according to claim 6, wherein said delay circuit includes a counter that receives a clock signal that is reset to zero as soon as said first light reception signal and said second light reception signal correspond to a same logic state, wherein the counter is activated as soon as said first light reception signal and said second light reception signal respectively have said first logic state and said second logic state and the counter supplies an inhibition signal until said counter has reached a certain level.

8. The portable electronic device according to claim 1, wherein the portable electronic device is an electronic bank card.

9. The portable electronic device according to claim 8, wherein the two photo-detectors are respectively arranged in two opposite areas of the electronic card.

10. The portable electronic device according to claim 8, wherein the two photo-detectors are arranged in a same area of the electronic card.

* * * * *